(12) United States Patent
Satou et al.

(10) Patent No.: US 8,037,982 B2
(45) Date of Patent: Oct. 18, 2011

(54) HYDRAULIC SHOCK ABSORBER FOR VEHICLE

(75) Inventors: Masahiro Satou, Iwata (JP); Katsuhiro Kondou, Iwata (JP); Seiji Sawai, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 11/181,393

(22) Filed: Jul. 14, 2005

(65) Prior Publication Data

US 2006/0006030 A1 Jan. 12, 2006

Related U.S. Application Data

(63) Continuation of application No. PCT/JP2004/000316, filed on Jan. 16, 2004.

(30) Foreign Application Priority Data

Jan. 17, 2003 (JP) ................. 2003-009158

(51) Int. Cl.
*F16F 9/48* (2006.01)
(52) U.S. Cl. .............. 188/314; 188/322.19; 267/226
(58) Field of Classification Search .......... 188/314, 188/313, 315, 322.19, 284; 267/226
See application file for complete search history.

(56) References Cited

U.S. PATENT DOCUMENTS

| 4,328,960 A * | 5/1982 | Handke et al. ............. 267/226 |
| 5,509,512 A * | 4/1996 | Grundei .................... 188/284 |
| 5,595,270 A | 1/1997 | Braun et al. |
| 5,996,978 A * | 12/1999 | Asanuma et al. ........... 267/34 |
| 6,220,406 B1 * | 4/2001 | de Molina et al. ......... 188/275 |
| 6,279,765 B1 * | 8/2001 | Monaco .................... 213/22 |
| 6,401,886 B1 | 6/2002 | Liang |
| 2001/0025753 A1 * | 10/2001 | Pfundstein et al. ......... 188/284 |

FOREIGN PATENT DOCUMENTS

| FR | 1125470 A | 10/1956 |
| JP | 57-109343 | 7/1982 |
| JP | 58-20 | 1/1983 |
| JP | 1-176507 | 12/1989 |
| JP | 4-95332 | * 8/1992 |
| JP | 4-106536 | 9/1992 |
| JP | 5-22885 | 3/1993 |
| JP | 05-060166 | 3/1993 |
| JP | 7-238968 | 9/1995 |
| JP | 10-141421 | 5/1998 |
| JP | 2001-317582 | 11/2001 |

OTHER PUBLICATIONS

International Search Report; Date of Mailing Apr. 27, 2004; 2 pages.
Answer to International Search Report; Date of Notification Apr. 27, 2004; 6 pages.
International Search Report; Date of Mailing Apr. 21, 2006; 3 pages.

* cited by examiner

*Primary Examiner* — Bradley King
(74) *Attorney, Agent, or Firm* — Keating & Bennett, LLP (57) ABSTRACT

A shock absorber has a spring positioned within a chamber. The spring provides a spring force on a piston that offsets a hydraulic force such that the forces on the piston are generally balanced when a vehicle is at rest.

5 Claims, 6 Drawing Sheets

HYDRAULIC SHOCK ABSORBER FOR VEHICLE

CROSS-REFERENCE TO RELATED APPLICATIONS

This application is a continuation of PCT/JP2004/000316, filed Jan. 16, 2004, which claimed the priority benefit of Japanese Patent Application No. 2003-009158, filed Jan. 17, 2003, each of which is hereby incorporated by reference.

BACKGROUND OF THE INVENTION

1. Field of the Invention

The present invention generally relates to hydraulic shock absorbers used to dampen relative motion between a vehicle body and a vehicle wheel. More particularly, the present invention relates to such shock absorbers featuring a gas chamber and a pair of fluid chambers in which the piston is spring-biased.

2. Description of the Related Art

In conventional hydraulic shock absorbers for vehicular applications, a piston is positioned within a cylinder. A piston rod that is coupled to the piston projects from one end of the cylinder. The hydraulic shock absorber is connected to the wheel and the vehicle body at opposing ends. Typically, the connection locations comprise a rubberized portion (see JP-A-Hei 5-60166, for example).

As is known, the piston is formed with multiple communication passages that allow for fluid to flow from one chamber to another chamber through the piston. The fluid flow is controlled to provide the desired degree of damping. In other words, damping force is generated as the hydraulic shock absorber for a vehicle is extended or contracted due to movement of the hydraulic fluid from one fluid chamber to the other through the communication passages formed in the piston.

Of course, one fluid chamber will have a smaller volumetric change during movement because the piston rod is positioned within that chamber. In other words, as the piston moves down, the volume of the chamber occupied by the piston rod increases, which decreases the amount of fluid that can flow into that chamber. In order to accommodate the difference in volumes, the other chamber has a moveable wall defined by a free piston. The free piston typically separates the other chamber from a gas chamber. The gas chamber is commonly filled with high pressure gas such that the free piston is biased by high-pressure gas (see JP-A-2001-317582, for example).

Conventional hydraulic shock absorbers have a bump stop that is positioned between the cylinder end and the piston, as disclosed for example in JP-U-Hei 5-22885 and JP-A-Hei 10-141421. The bump stop is designed to prevent the piston from colliding with the cylinder in a fully extended position. The bump stop typically is formed of rubber, a compression coil spring, or the like. The bump stop is not in contact with the piston during normal use and is compressed between the cylinder body and the piston during extreme extension of the shock absorber.

SUMMARY OF THE INVENTION

In such conventional shock absorbers, however, the pressure of the high-pressure gas is transferred to the hydraulic fluid in the cylinder through the free piston, which causes the main piston to be pushed in an expansion direction. The reason for this is as follows. One end surface of the piston opposing the free piston receives the pressure over the entire surface. On the other hand, the other end surface of the piston on the piston rod side receives the pressure over a smaller area due to removal of the cross sectional area of the piston rod.

Since the piston is pushed toward the piston rod side to thereby expand the hydraulic shock absorber, the rubber component at the shock mounts is compressed at all times. Therefore, the intended shock absorbing function of the rubber component is impaired and vibrations and other minor bumps are readily transferred between the vehicle body and the suspended wheel. Such a transfer limits the degree to which a smooth ride can be provided.

Accordingly, a hydraulic shock absorber is desired in which the shock absorbing function of a rubber in the shock mount can be better isolated from permanent loading such that its performance is not so severely impaired. Thus, a spring has been positioned to offset the hydraulic force with an elastic force.

Accordingly, one aspect of the present invention relates to a hydraulic shock absorber for a vehicle. The shock absorber comprises a cylinder body. The cylinder body comprises a closed end and an open end. A first piston is positioned within the cylinder body between the closed end and the open end. A second piston is positioned between the first piston and the open end. A first chamber is defined between the piston and the closed end, a second chamber is defined between the first piston and the second piston, and a third chamber is defined between the second piston and the open end. The first chamber is filled with high-pressure gas. A cylinder cover closes the open end. A piston rod extends through the cylinder cover and is connected to the second piston. The second piston has a first surface area on a side facing the second chamber and a second surface area on a side facing the third chamber. A cushion is interposed between the piston rod and at least one of a vehicle frame and a wheel side member. A spring is disposed within the third chamber. The piston rod extends inside of the spring. The spring has an elastic reaction force that generally cancels a force from the high-pressure gas acting on the second piston caused by the first surface area being larger than the second surface area.

Another aspect of the present invention relates to a hydraulic shock absorber for a vehicle. The shock absorber comprises a cylinder body. The cylinder body comprises a bottom and a top. A first piston is positioned within the cylinder body between the bottom and the top. A first chamber is defined in the cylinder between the first piston and the bottom. The first chamber is filled with high-pressure gas. A second piston is positioned between the top of the cylinder body and the first piston. A piston rod extends through the top and is connected to the second piston. The second piston has a first surface area on a first generally circular face and a second surface area on a second generally circular face. A cushion is interposed between the cylinder body and at least one of a vehicle frame member and a wheel side member. A first coil spring and a second coil spring are positioned within the cylinder body in a location between the second piston and the top of the cylinder body. The piston rod extends through the first coil spring and the second coil spring. The first coil spring is positioned between the piston rod and the second coil spring. The first coil spring and the second coil spring are coiled in opposite directions. The first and second coil springs have a combined elastic reaction force that generally cancels a force from the high-pressure gas acting on the second piston caused by the first surface area being larger than the second surface area.

BRIEF DESCRIPTION OF THE DRAWINGS

These features, aspects and advantages will be described in detail with reference to the accompanying drawings. The drawings comprise 9 figures.

DETAILED DESCRIPTION OF THE PREFERRED EMBODIMENT

FIGS. 1-4 illustrate an embodiment of a hydraulic shock absorber 1 that is arranged and configured in accordance with certain features, aspects and advantage of the present invention. The illustrated shock absorber is particularly suited for use with a vehicle. In particular, the hydraulic shock absorbers described herein are particularly useful with vehicles such as automobiles, motorcycles, three wheelers, four wheelers, snowmobiles and most other vehicles on which a driver rides.

FIGS. 1(a) and 1(b) illustrated a single shock absorber 1 in two different stroke positions. In particular, in these sectional views, FIG. 1(a) shows the shock absorber 1 in a contracted state and FIG. 1(b) shows the shock absorber 1 in an extended state. As is customary, the hydraulic shock absorber 1 is interposed between a frame of a vehicle and a wheel of the vehicle. In the illustrated hydraulic shock absorber 1, a lower end of a cylinder 2 of the shock absorber 1 is coupled to a wheel side member (not shown) through a trunnion containing a cushion rubber 3. Also, in the hydraulic shock absorber 1, as shown in FIG. 3, the upper end of a piston rod 4 of the shock absorber 1 projects upward beyond the cylinder 2 and is coupled to a frame member 5 of the vehicle body through a cushion rubber 6, which will be described in further detail below (see FIG. 3).

Figure 3:
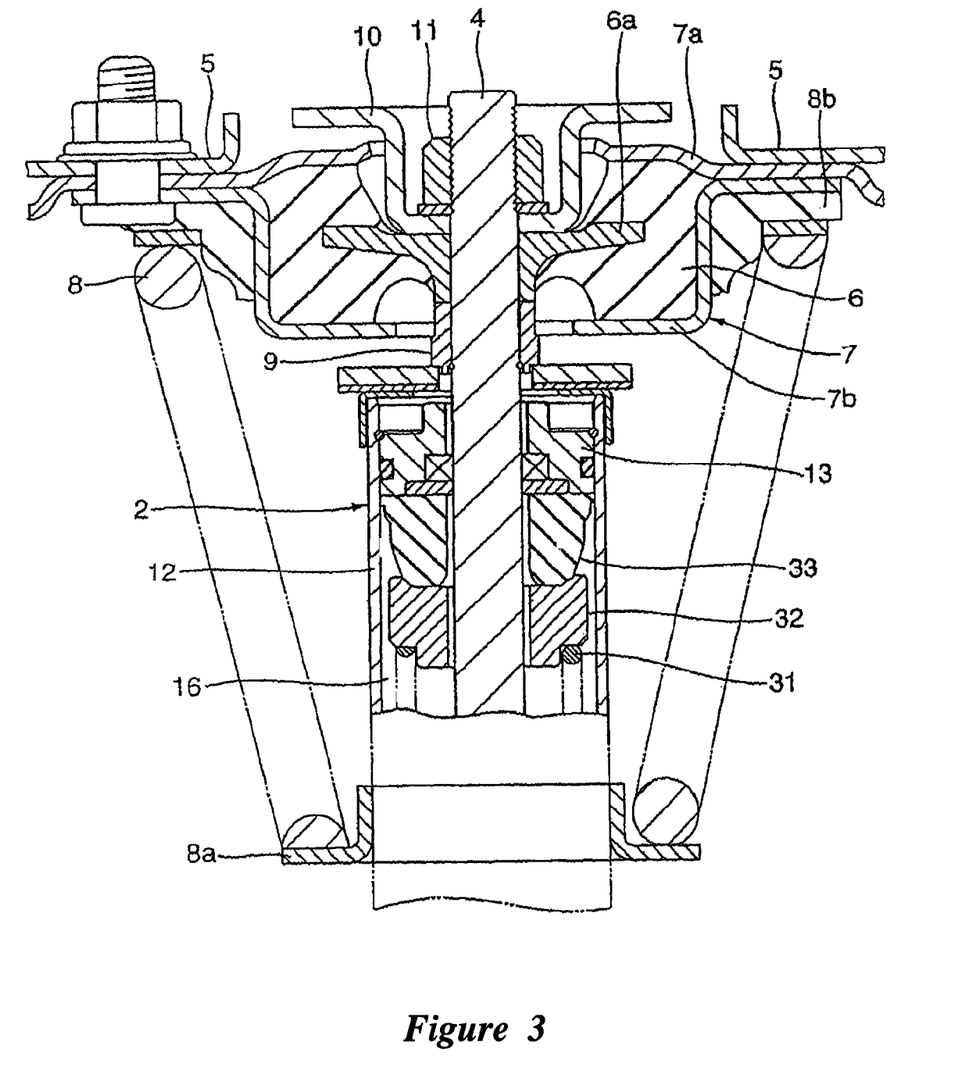
FIG. 3 is a sectioned view showing a region of the shock absorber where the piston rod is connected to a vehicle body side.
Figure 4:
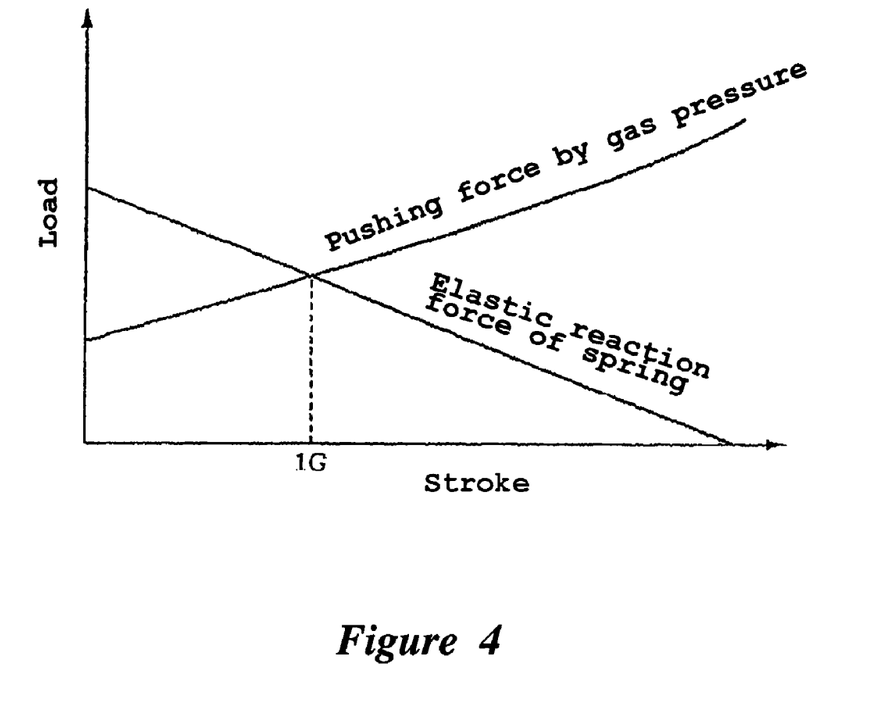
FIG. 4 is a graph showing a relationship between the stroke of the hydraulic shock absorber, the pushing force and the elastic reaction force.

With reference now to FIG. 3, an upper support 7 couples an upper end of the piston rod 4 to the frame member 5 of the vehicle body. In the illustrated arrangement, the upper support 7 also holds the upper end of a suspension compression coil spring 8. Thus, the upper support 7 connects the suspension compression coil spring 8 to the frame member 5.

In the illustrated configuration, the upper support 7 comprises an upper plate 7a and a lower plate 7b. A void, which is a generally annular hollow space in the illustrated arrangement, is defined by the upper plate 7a and the lower plate 7b. The cushion rubber 6 generally is formed by placing the compound into the void and allowing it to harden in place.

A pressure receiving plate 6a preferably is secured within the cushion rubber 6. In the illustrated arrangement, the cushion rubber 6 cures about the pressure receiving plate 6a. Thus, the cushion rubber 6 elastically supports the pressure receiving plate 6a between the upper plate 7a and the lower plate 7b.

The pressure receiving plate 6a comprises a through hole which may be formed by drilling once the pressure receiving plate 6a is secured within the cushion rubber 6. The piston rod 4 extends through the through hole and connects to the upper support 7 via the pressure receiving plate 6a and the cushion 6.

A support bracket 8a supports a lower end of the suspension compression coil spring 8 on a cylinder body 12 of the cylinder 2. A cushion 8b is positioned between the upper support 7 and the suspension compression coil spring 8. Thus, the reaction force of the suspension compression coil spring 8 does not directly act on the cushion 6 interposed between the piston rod 4 and the frame member 5 but, instead, is preferably isolated to act on the frame member 5 through the upper plate 7a, the lower plate 7b and the cushion 8b.

The cylinder body 12 of the cylinder 2 is urged downward by the elastic reaction force of the suspension compression coil spring 8, which supports the weight of the vehicle. However, the cylinder body 12 preferably can be displaced somewhat in generally vertical directions independent of the suspension compression coil spring 8, due to slight elastic deformation of the support bracket 8a. Therefore, the hydraulic shock absorber 1 can damp shocks and vibrations that are transmitted to the cylinder body 12, by the vertical displacement of the cylinder body as described above.

With reference still to FIG. 3, the upper end of the piston rod 4 is fitted with a cylindrical body 9. In the illustrated configuration, the cylindrical body 9 is secured in position with a snap ring or another suitable component. Thus, the cylindrical body 9 is generally secured against downward movement along the piston rod 4.

The upper end of the piston rod 4 extends upward from the cylindrical body 9 through the hole of the pressure receiving plate 6a. The upper end of the piston rod 4 also extends through a pushing plate 10. A nut 11 secures the pushing plate 10 onto the piston rod such that the pushing plate 10 overlaps the pressure receiving plate 6a. The cushion 6 of the upper support 7 elastically supports the upper end of the piston rod 4 on the frame member 5 due to the nut 11, the pushing plate 10, the upper plate 7a and the lower plate 7b.

With reference again to FIGS. 1(a) and 1(b), an upper end of the cylinder 2 generally comprises the cylinder body 12 and a cylinder cover 13. The cylinder body 12 is formed in the shape of a closed-bottom cylinder, which has an opening at an upper end. The cylinder cover 13 closes the opening at the upper end of the cylinder body 12 with the piston rod 4 extending through a small hole formed in the cylinder cover 13. Together with suitable seals and guides, the cylinder cover 13 supports the piston rod 4 such that the piston rod 4 can reciprocate in and out of the cylinder body 12.

Together, a piston 14 and a free piston 15 divide the inside of the cylinder body 12 into an upper fluid chamber 16, a lower fluid chamber 17, and a high-pressure gas chamber 18. The lower end of the piston rod 4 supports the piston 14. The free piston 15 is fitted in the vicinity of the lower end of the cylinder body 12. Thus, the piston 14 and the cylinder cover 13 define the upper fluid chamber 16, the piston 14 and the free piston 15 define the lower fluid chamber 17 and the free piston 15 and the bottom of the cylinder body 12 define the high-pressure gas chamber 18. Preferably, hydraulic fluid fills the upper fluid chamber 16 and the lower fluid chamber 17 while nitrogen gas fills the high-pressure gas chamber 18.

Figure 2:
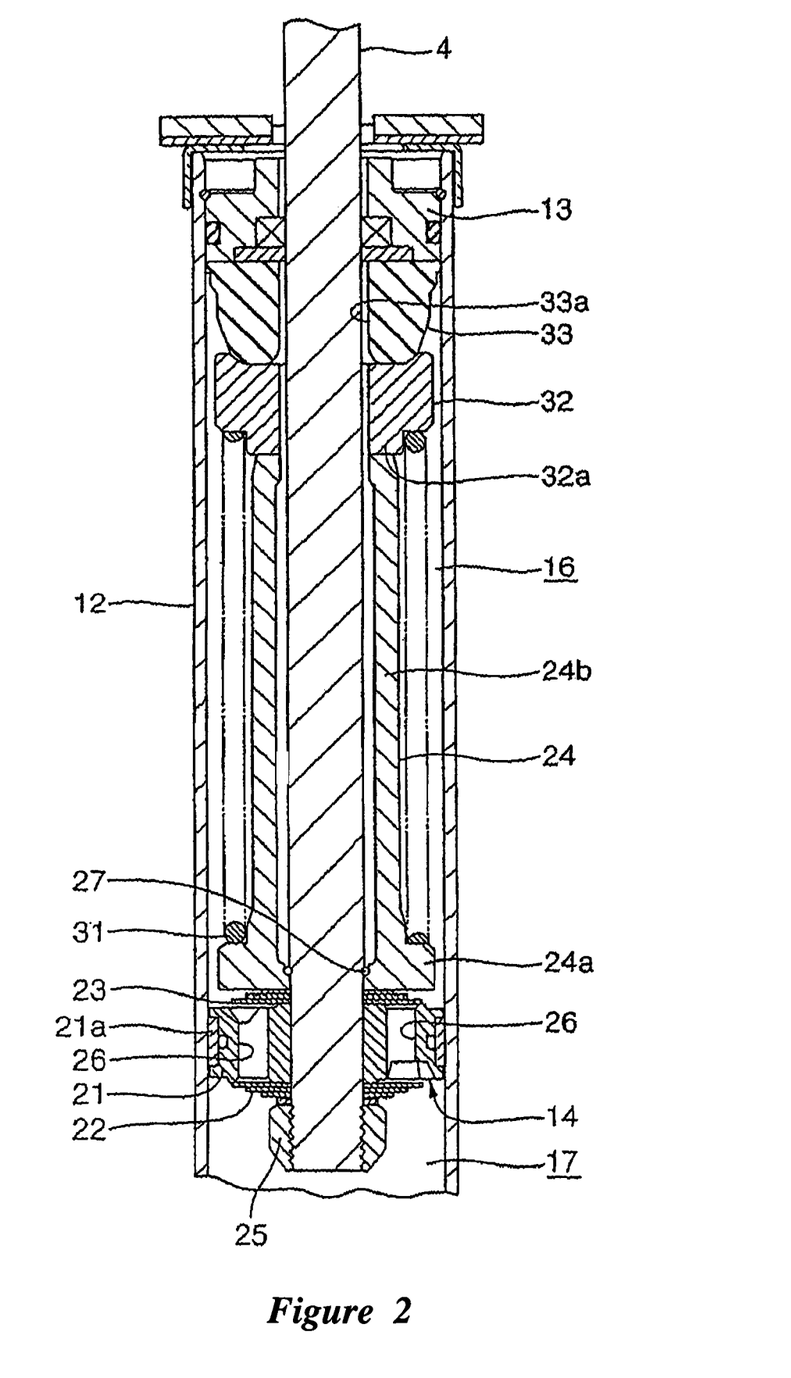
FIG. 2 is an enlarged sectioned view of the shock absorber of FIGS. 1(a) and 1(b) showing a piston, a piston rod and an upper portion of a cylinder.

The piston 14 can be any suitable piston 14. With reference to FIG. 2, the illustrated piston 14 generally comprises a piston body 21 and first and second shim stacks 22 and 23. The piston rod 4 extends through the piston body 21 and supports the piston body with a nut 25 in the illustrated configuration. The piston body 21 is clamped between a support pipe 24 held on the piston rod 4 over the piston 14 and the nut 25 threaded on the lower end of the piston rod 4. The first and second shim stacks 22 and 23 are provided respectively on the upper and lower end sides of the piston body 21.

The piston body 21 is mounted with a seal member 21a on its outer periphery. Also, the piston body 21 contains needle valves or other passages that can be formed by drilling. The passages define plural communication holes 26 that penetrate the piston body 21 vertically from top to bottom. The first and second shim stacks 22 and 23 are formed as stacks of washer shaped members. The shim stacks 22, 23 are structured to open and close either end of the communication holes 26 by hydraulic pressure. In other words, the first shim stack 22 will limit flow through a first set of the communication holes 26 through the piston body 21 to a first direction and only when the hydraulic pressure is sufficiently high while the second shim stack 22 will limit flow through a second set of the communication holes 26 to a second direction and only when the hydraulic pressure is sufficiently high. As used herein, the first and second shim stacks 22 and 23 and the communication holes 26 constitute an aperture of the piston 14 unless otherwise apparent.

With continued reference to FIG. 2, the support pipe 24 is formed in the shape of a cylinder and the piston rod 4 extends through the central passage of the support pipe 24. Other shapes and configuration for the support pipe 24 can be used. The lower end of the support pipe 24 preferably is in engagement with a circlip 27 attached to the piston rod 4. Of course, other structures also can be used to limit movement of the support pipe 24 relative to the piston rod 4. In particular, in one configuration, the support pipe 24 is secured against upward movement relative to the piston rod 4. Thus, with the piston 14 attached to the piston rod 4 as described above, the support pipe 24 is secured for movement with the piston rod 4.

With continued reference to FIG. 2, the lower end of the support pipe 24 preferably comprises a flange 24a, which has a larger outside diameter than a cylindrical portion 24b of the support pipe 24. In some configurations, the flange 24a and the cylindrical portion 24b are integrally formed. The flange 24a of the support pipe 24 carries the lower end of a compression coil spring 31, which is described below.

In one configuration, the compression coil spring 31 is inserted in the cylinder 2 after the support pipe 24 and the piston rod 4 have been positioned in the cylinder 2 such that the piston rod 4 and the support pipe 24 extend through a central aperture defined by the coil spring 31. A stopper 32 is then positioned over the compression coil spring 31 and the piston rod 4 such that the compression coil spring 31 is elastically mounted between the flange 24a of the support pipe 24 and the stopper 32. In one preferred configuration, the stopper 32 is formed in an annular shape with the piston rod 4 extending through a through hole in its axial center such that the piston rod 4 can reciprocate relative to the stopper 32. The lower end of the stopper 32 preferably also is formed with a centering projection 32a projecting downward. The centering projection 32a extends slightly into the central aperture defined by the coil spring 31. Accordingly, the stopper 32 holds the upper end of the compression coil spring 31 with the projection 32a fitted inside of the upper end of the compression coil spring 31.

As illustrated, a bump stop 33 is provided between the stopper 32 and the cylinder cover 13. The bump stop 33 preferably is a shock absorbing elastic member. The bump stop 33 comprises a central through hole 33a that accommodates the piston rod 4 such that the piston rod 4 can reciprocate within the hole 33a. The bump stop 33 also is secured to the lower surface of the cylinder cover 13 and projects downward from the lower surface of the cylinder cover 13.

Figure 1:
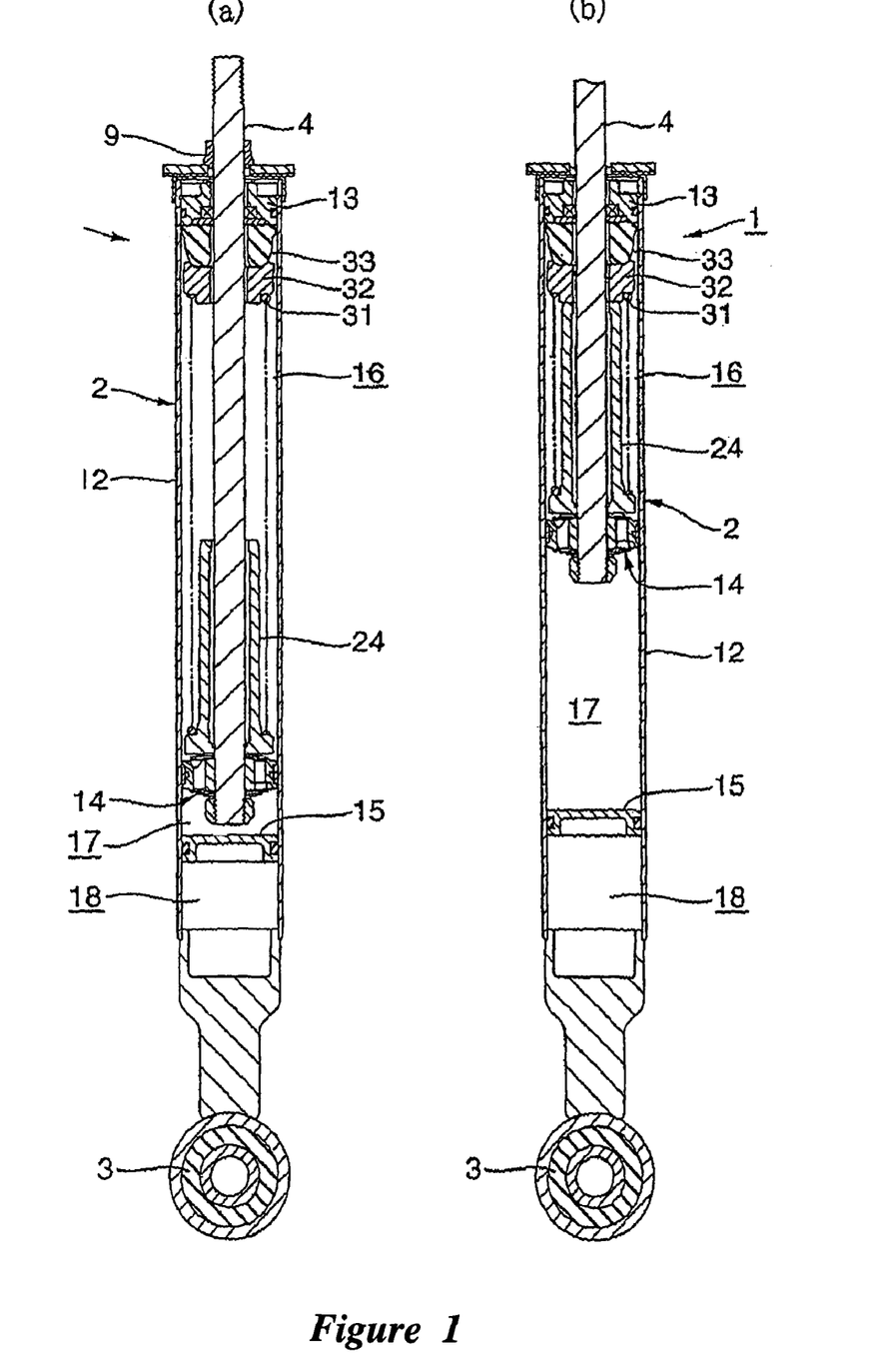
FIGS. 1(a) and 1(b) show sectioned views of a hydraulic shock absorber that is arranged and configured in accordance with certain features, aspects and advantages of the present invention.

Preferably, the compression coil spring 31 is long enough to maintain some degree of contact between the support pipe 24 and the stopper 32, even when the piston 14 is in its lowermost position in the cylinder 2 (e.g., with the cylindrical body 9 on the upper end of the piston rod 4 prohibited by the cylinder cover 13 from moving downward—as shown in FIG. 1(*a*)). In other words, the compression coil spring 31 preferably has sufficient length to maintain some degree of compression in all modes of operation.

In the illustrated arrangement, the support pipe 24 limits the upward movement of the piston 14 within the cylinder 2. The limited movement of the piston 14 helps ensure that the characteristics of the compression coil spring 31 do not change substantially even in its most-compressed condition. In other words, when the piston rod 4 reaches its highest position in the cylinder 2, the upper end of the support pipe 24 abuts on the stopper 32 located over it. The contact between the upper end of the support pipe 24 and the stopper 32 prohibits the piston 14 from continuing to move upward beyond this point, which defines a predetermined degree of compression, when the hydraulic shock absorber 1 is contracted.

Preferably, the support pipe 24 has a length between its upper end and the flange 24a which is generally equal to or longer than the minimum length of the compression coil spring 31 at its elastic limit in a compressed state. Thus, the compression coil spring 31 is not compressed sufficiently to take a set because the upper end of the support pipe 24 abuts the lower end of the projection 32a of the stopper 32 as shown in FIGS. 1(*b*) and 2. The minimum length at the elastic limit refers to the length of the compression coil spring 31 when it is contracted to a length just prior to the stresses placed on the spring by the compression exceeding the spring's capabilities or changing its characteristics.

The upper end surface area of the piston 14 is smaller than the lower end surface area because of the cross sectional area of the piston rod 4. Thus, the forces from the high-pressure gas pressing upward on the piston are greater than the corresponding forces pressing downward. However, the compression coil spring 31 is elastically mounted between the piston 14 and the cylinder cover 13 and presses the piston 14 downward and the piston 14 is continuously urged downwardly by the reaction force of the compression coil spring 31. Thus, the hydraulic forces created by the high pressure gases are cancelled by the elastic reaction force of the compression coil spring 31.

The compression coil spring 31 used in this embodiment has an elastic reaction force generally equal to the force created by the high pressure gas under a standard vehicle height condition (e.g., one driver in the vehicle with the vehicle stopped or operating under generally steady state conditions—not accelerating, decelerating, or turning). As used herein, positions of the piston 14 under the standard vehicle height condition are referred to as positions in a normal use range according to the present invention.

When the illustrated hydraulic shock absorber 1 is contracted, the stroke position of the piston rod 4 increases (i.e., more of the piston rod goes into the cylinder 2), which gradually reduces the elastic reaction force of the compression coil spring 31 by extending the spring 31. At this time, the gas pressure in the high-pressure gas chamber 18 gradually increases. The elastic reaction force of the compression coil spring 31 preferably is set such that the elastic reaction force reduces gradually and the force created by the gas pressure increases gradually (the force changes are generally equal to each other under the standard vehicle height state—indicated as 1G in FIG. 4). Thus, the forces in the illustrated hydraulic shock absorber 1 generally balance out through the stroke of the piston and the illustrated hydraulic shock absorber 1 can cancel out the pushing force of the high pressure gas and the elastic reaction force of the compression spring, thereby reducing the force compressing the cushion rubber 6 interposed between the hydraulic shock absorber 1 and the vehicle body side. Accordingly, in the illustrated hydraulic shock absorber 1, the cushion rubber 6 can effectively absorb the shock which occurs when, for example, the wheel goes over minute bumps on the road surface, such as when cross the center dividing lines or the like.

In one configuration, the spring constant of the compression coil spring 31 is preferably set to about 20% of the suspension compression coil spring 8 or lower. Setting the spring constant in this range has been found to reduce the pushing force created by the high pressure gas in the manner described above over substantially the entire stroke range of the hydraulic shock absorber 1.

Under the standard vehicle height condition described above, the load set for the compression coil spring 31 is preferably about 50% to 150% the pushing force by the high-pressure gas. This configuration can reduce the pushing force to 60% or lower at all times as compared to conventional techniques.

As described above, the elastic reaction force of the compression coil spring 31 preferably acts on the piston 14 even when the hydraulic shock absorber 1 is fully extended. However, in some configurations, the elastic reaction force may act on the piston 14 only in a normal range of movement of the piston 14, which can achieve an effect similar to that described above.

Figure 5:
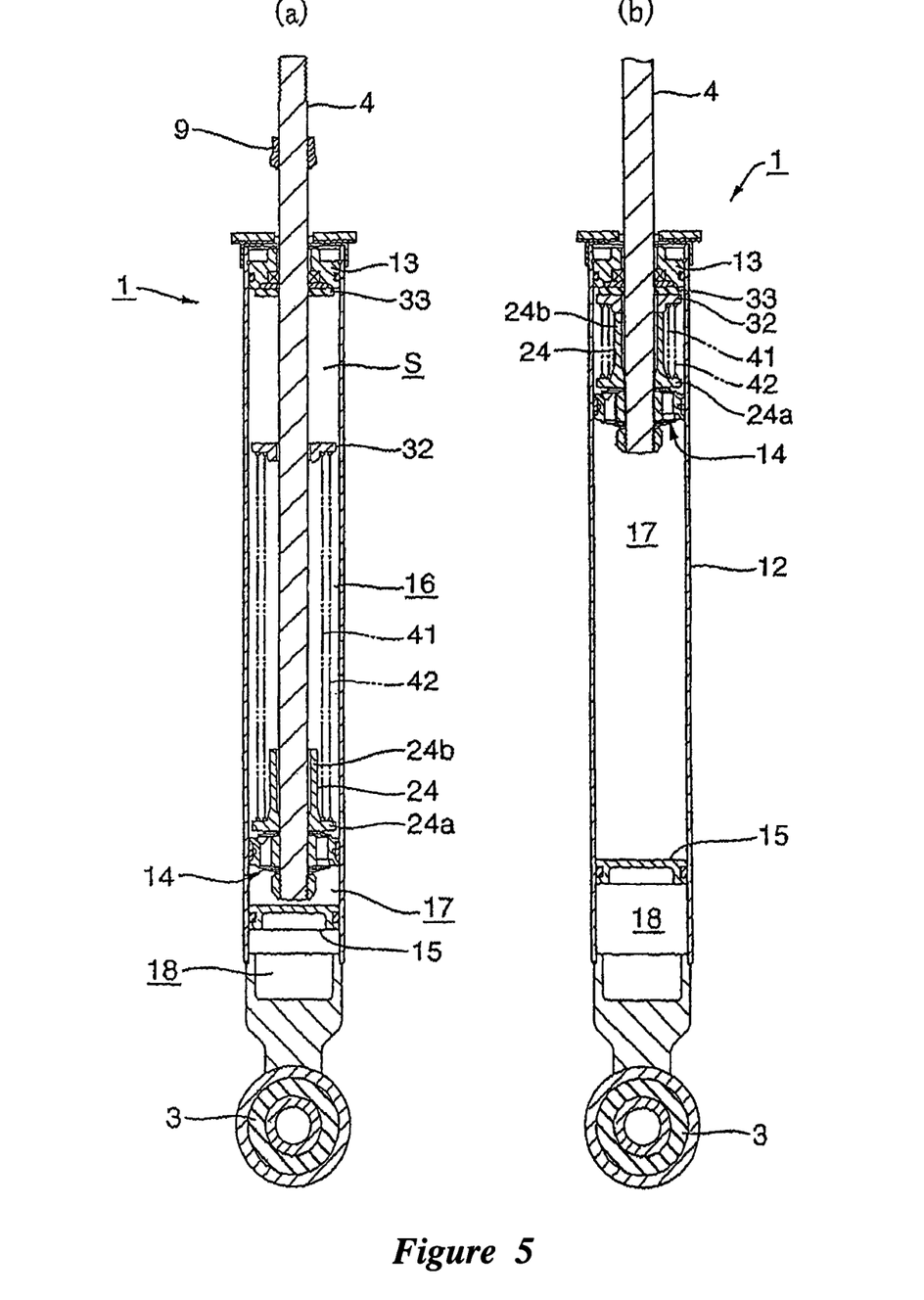
FIGS. 5(a) and 5(b) show sectioned views of another hydraulic shock absorber that is arranged and configured in accordance with certain features, aspects and advantages of the present invention.
Figure 6:
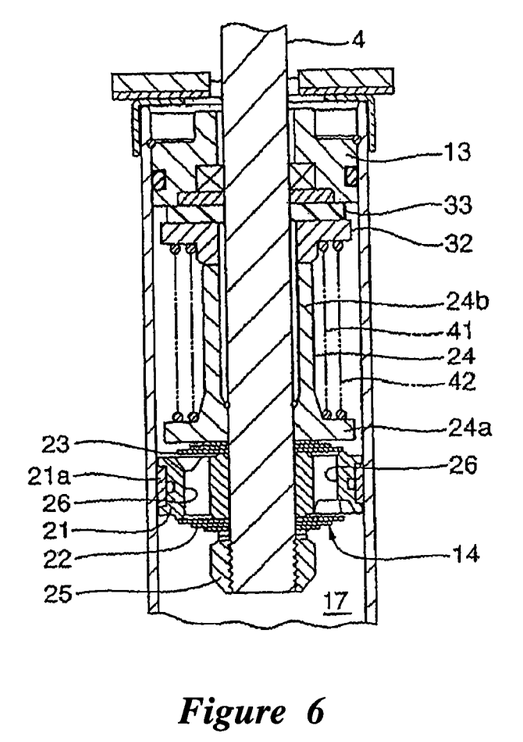
FIG. 6 is an enlarged sectioned view of the shock absorber of FIGS. 5(a) and 5(b) showing a piston, a piston rod and an upper portion of a cylinder.

Another embodiment of a hydraulic shock absorber that is arranged and configured in accordance with certain features, aspects and advantages of the present invention is shown in FIGS. 5(a), 5(b) and 6. In describing this embodiment, components identical to, or at least similar to, those described in relation to FIGS. 1-4 are denoted by the same reference numerals, and their detailed descriptions are not repeated unless deemed necessary for improved clarity of the description.

As shown in FIGS. 5(a), 5(b) and 6, the hydraulic shock absorber 1 preferably is elastically mounted with a first compression coil spring 41 and a second compression coil spring 42, which springs preferably are disposed coaxially with the piston rod 4 in the cylinder 2. In this configuration, the combined elastic reaction force of the springs 41, 42 generally cancels out the pushing force created by the high-pressure gas.

As illustrated, the first compression coil spring 41 is located generally adjacent to the support 24 with the second compression coil spring 42 being located outside of the first compression coil spring 41. The first and second compression coil springs 41, 42 preferably are generally equal in axial length (overall length). Also, the first and second compression coil springs 41, 42 preferably are wound in opposing directions so that the coil springs are less likely to catch on each other during movement.

In one configuration, the overall length of the first and second compression coil springs 41, 42 preferably is set such that the elastic reaction force urging the stopper 32 upward is balanced out when the hydraulic shock absorber 1 is in a so-called fully contracted condition. The fully contracted condition refers to a state in which the piston 14 has moved downward relative to positions commonly encountered during normal operation. Thus, a gap S can be formed between the stopper 32 and the bump stop 33 when the shock absorber is in a fully contracted condition, such as that shown in FIG. 5(a).

Figure 7:
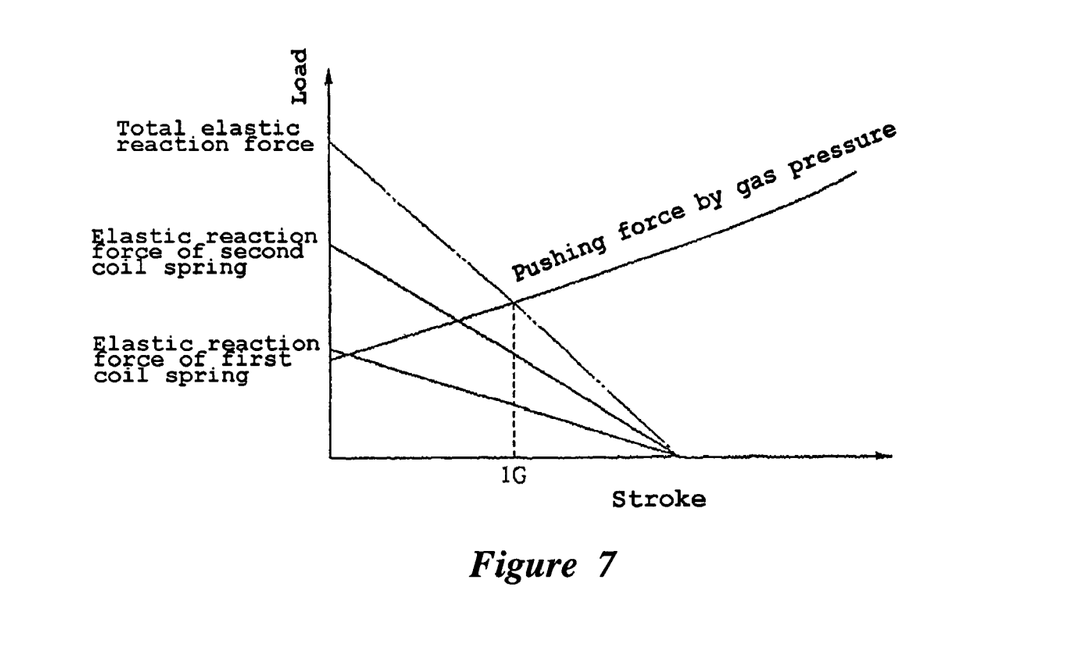
FIG. 7 is a graph showing a relationship between the stroke of the hydraulic shock absorber, the pushing force and the elastic reaction force.

With the first and second compression coil springs 41, 42 elastically mounted in parallel with each other in the cylinder 2, the compression coil springs can have a larger spring constant compared to that in the first embodiment without changing their overall length. In other words, in the hydraulic shock absorber 1 shown in FIG. 5, the piston 14 is urged downward by the total elastic reaction force obtained by adding the elastic reaction forces of the first and second compression coil springs 41, 42. As shown in FIG. 7, the total elastic reaction force and the pushing force by the high-pressure gas preferably are set to be generally equal to each other under the standard vehicle height condition (e.g., the intersection indicated at 1G in FIG. 7).

Preferably, the pushing force generated by the difference in surface area between the two end surfaces of the piston 14 is substantially canceled out by the elastic reaction force of the first and second compression coil springs 41, 42. Thus, the force compressing the cushion rubber interposed between both ends of the hydraulic shock absorber 1 and the vehicle body and wheel sides is reduced, similar to the arrangement described above. Also, if the first and second compression coil springs 41, 42 have different winding directions from each other, the two springs 41, 42 are less likely to hang due to contact and, their expansion and contraction is less likely to be impeded be incidental contact between the two springs 41, 42.

It should be noted that the total elastic reaction force (i.e., the sum of the elastic reaction forces of the first and second compression coil springs 41, 42) is larger than the single counterpart in the arrangement first described above. Thus, the first and second compression coil springs 41, 42 can be used in place of a bump stop for absorbing the shock which occurs when the hydraulic shock absorber 1 is in its most expanded state as shown in FIG. 5(b).

In some configurations, however, a bump stop can be included in a construction similar to FIGS. 5(a), 5(b) and 6. For instance, a bump stop 33 is interposed between the stopper 32 and the cylinder cover 13 in FIG. 6. The bump stop 33 is mainly for the purpose of absorbing the shock which occurs when the stopper 32, which has been located under and spaced from the cylinder cover 13 (see FIG. 5(a)) is raised together with the piston 14 to abut on the cylinder cover 13. Thus, the bump stop 33 is formed to be thinner than the one described with respect to FIG. 1, which was designed primarily for the purpose of absorbing the shock which occurs in the fully extended state (or the bump stop 33 in the first embodiment). Thus, the dual spring hydraulic shock absorber has a smaller number of constituent parts than one provided with a coil spring which functions exclusively as a rebound spring, thereby providing a construction capable of achieving cost and weight reduction.

Although the present invention has been described in terms of certain preferred embodiments, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A vehicle comprising:
a vehicle frame; and
a hydraulic shock absorber including:
   a fluid chamber defined by a cylinder, a piston rod, and a piston including an aperture arranged to receive pressure from a high-pressure gas;
   a cushion rubber interposed between the piston rod and at least one of the vehicle frame and a wheel side member; and
   a spring disposed in the cylinder; wherein
the spring includes a sufficient length to be compressed when the vehicle is in a standard vehicle height condition, wherein the standard vehicle height condition is defined by the vehicle being stopped or operated under steady state conditions in which the vehicle is not accelerating, decelerating, or turning;
the spring urges the piston in a direction that the piston rod is drawn into the cylinder, the spring includes a first coil spring located on a radially inner side and a second coil spring located on a radially outer side, and the first and second coil springs have different winding directions from each other; and
the first and second coil springs are arranged such that a combined elastic reaction force under the standard vehicle height condition is generally equal to a pushing force generated by a difference in surface areas between two sides of the piston.

2. A vehicle comprising:
a vehicle frame; and
a hydraulic shock absorber including:
   a cylinder body including a closed end and an open end;
   a first piston positioned within the cylinder body between the closed end and the open end;
   a second piston positioned between the first piston and the open end;
   a first chamber being defined between the first piston and the closed end, the first chamber being filled with a high-pressure gas;
   a second chamber being defined between the first piston and the second piston;
   a third chamber being defined between the second piston and the open end;
   a cylinder cover closing the open end;
   a piston rod extending through the cylinder cover and being connected to the second piston, the second piston including a first surface area on a side facing the second chamber and a second surface area on a side facing the third chamber;
   a cushion being interposed between the piston rod and at least one of the vehicle frame and a wheel side member; and
   a first spring arranged within the third chamber, the piston rod extending inside of the first spring; wherein
the first spring includes a sufficient length to be compressed when the vehicle is in a standard vehicle height condition, wherein the standard vehicle height condition is defined by the vehicle being stopped or operated under steady state conditions in which the vehicle is not accelerating, decelerating, or turning; and
the first spring has an elastic reaction force that generally cancels a force from the high-pressure gas acting on the second piston caused by the first surface area being larger than the second surface area.

3. The vehicle of claim 2, wherein the cushion is interposed between the piston rod and the vehicle frame, and the cushion is arranged such that when the elastic reaction force generally cancels the force from the high-pressure gas, a force compressing the cushion between the piston rod and vehicle frame is reduced.

4. The vehicle of claim 2, wherein during the standard vehicle height condition, a load on the first spring is about 50% to about 150% of the force from the high-pressure gas.

5. A vehicle comprising:
a vehicle frame; and
a hydraulic shock absorber including:
   a cylinder body including a closed end and an open end;
   a first piston positioned within the cylinder body between the closed end and the open end;
   a second piston positioned between the first piston and the open end;
   a first chamber being defined between the first piston and the closed end, the first chamber being filled with a high-pressure gas;
   a second chamber being defined between the first piston and the second piston;
   a third chamber being defined between the second piston and the open end;
   a cylinder cover closing the open end;
   a piston rod extending through the cylinder cover and being connected to the second piston, the second piston including a first surface area on a side facing the second chamber and a second surface area on a side facing the third chamber;
   a cushion being interposed between the piston rod and at least one of the vehicle frame and a wheel side member; and
   a first spring arranged within the third chamber, the piston rod extending inside of the first spring; wherein
the first spring includes a sufficient length to be compressed when the vehicle is in a standard vehicle height condition, wherein the standard vehicle height condition is defined by the vehicle being stopped or operated under steady state conditions in which the vehicle is not accelerating, decelerating, or turning; and
the cushion is interposed between the piston rod and the vehicle frame, a suspension compression coil spring is arranged between the hydraulic shock absorber and the vehicle frame, and a spring constant of the first spring is about 20% or lower of a spring constant of the suspension compression coil spring.

* * * * *